(12) United States Patent
Naito et al.

(10) Patent No.: US 6,280,566 B1
(45) Date of Patent: Aug. 28, 2001

(54) VIBRATION WELDING APPARATUS HAVING AN EASY TO ASSEMBLE JIG STRUCTURE

(75) Inventors: Toshitaka Naito; Masahiko Koizumi; Seiichi Gyotoku; Fuzihiko Sugiyama; Masahiko Nishizaki, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/458,071

(22) Filed: Dec. 10, 1999

(30) Foreign Application Priority Data

Dec. 10, 1998 (JP) ................................. 10-351428

(51) Int. Cl.$^7$ ............................ B29C 65/08; B30B 15/02
(52) U.S. Cl. .................. 156/580.1; 156/580; 425/174.2; 425/193; 100/918; 269/47; 29/525.02
(58) Field of Search ................................. 156/580, 580.1; 425/174.2, 193, 195; 100/918; 269/47, 49; 29/525.02

(56) References Cited

U.S. PATENT DOCUMENTS

| | | | | |
|---|---|---|---|---|
| 2,420,165 | * | 5/1947 | Clutter | 269/47 |
| 4,325,300 | * | 4/1982 | Fortier et al. | 100/918 |
| 4,647,336 | | 3/1987 | Coenen et al. | . |
| 5,002,477 | * | 3/1991 | Case et al. | 425/193 |
| 5,931,367 | | 8/1999 | Sato et al. | . |

FOREIGN PATENT DOCUMENTS

| | | |
|---|---|---|
| 9-245508 | 9/1997 | (JP) . |
| 10-334705 | 12/1998 | (JP) . |
| 11-7805 | 1/1999 | (JP) . |

* cited by examiner

Primary Examiner—Michael W. Ball
Assistant Examiner—Michael A. Tolin
(74) Attorney, Agent, or Firm—Sughrue, Mion, Zinn, Macpeak & Seas, PLLC

(57) ABSTRACT

A vibration welding apparatus for welding synthetic resin parts together by vibrating one of the resin parts while the resin parts are in contact with each other. An upper jig for supporting one of the synthetic resin parts, a lower jig for supporting the other of the snythetic resin parts and a vibrating member to which the upper jig is attached are provided in the apparatus. The jigs are held together by bolts which can withstand the vibrating motions. Head portions of the bolts are inserted into insertion holes of the upper jig, notches of spacers are engaged with the shaft portions of the bolts between an attached portion of the upper jig and the head portions of the bolts, and the bolts are fastened to the vibrating member in the state where the notches are engaged with the shaft portions, so that the attached portion is fastened through the spacers by the head portions of the bolts and the vibrating member to thereby attach the upper jig to the vibrating member.

4 Claims, 4 Drawing Sheets

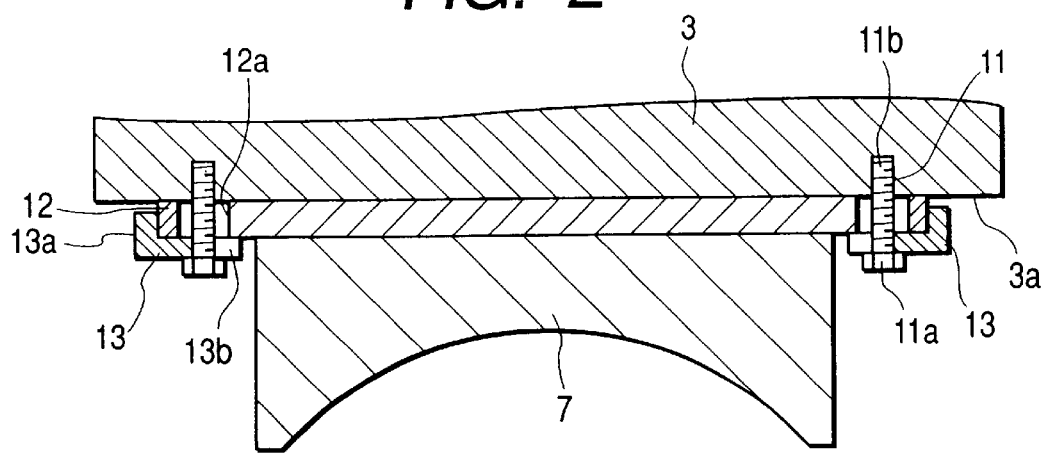
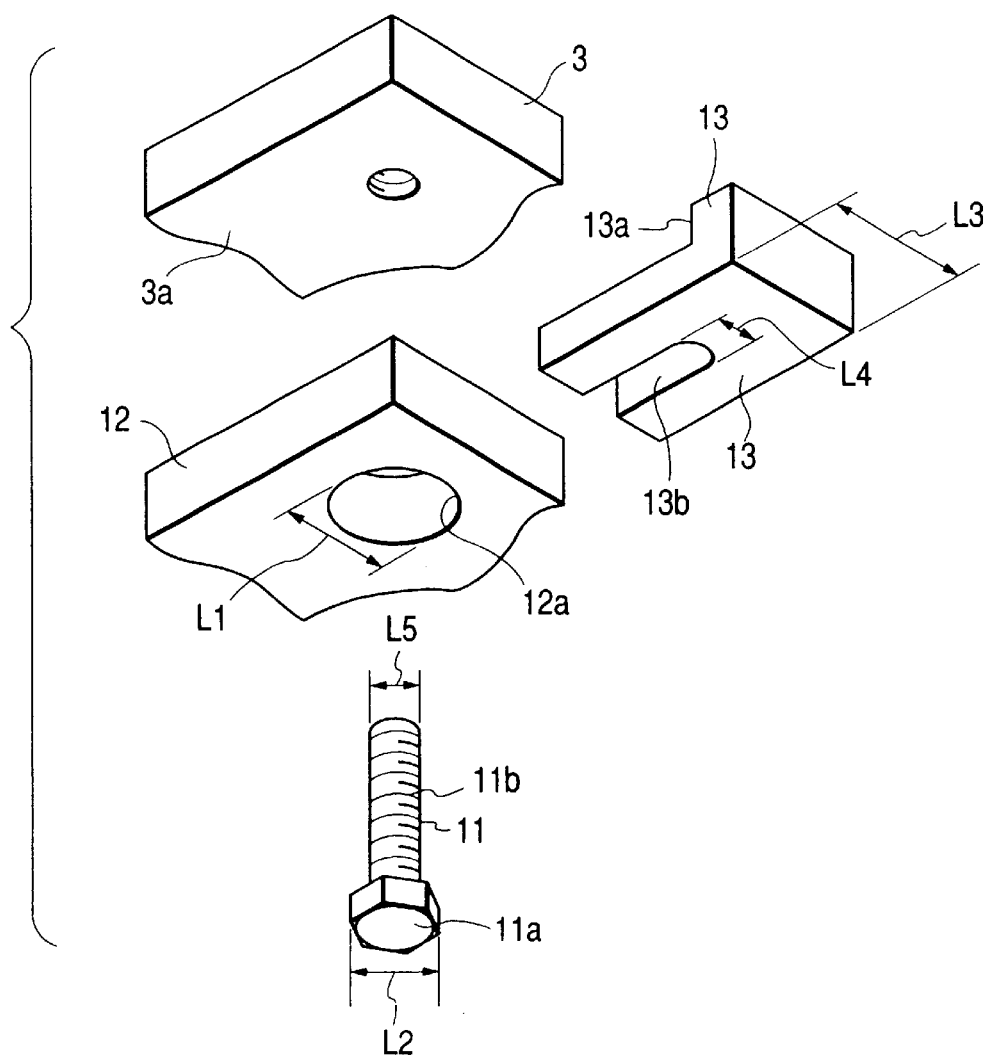

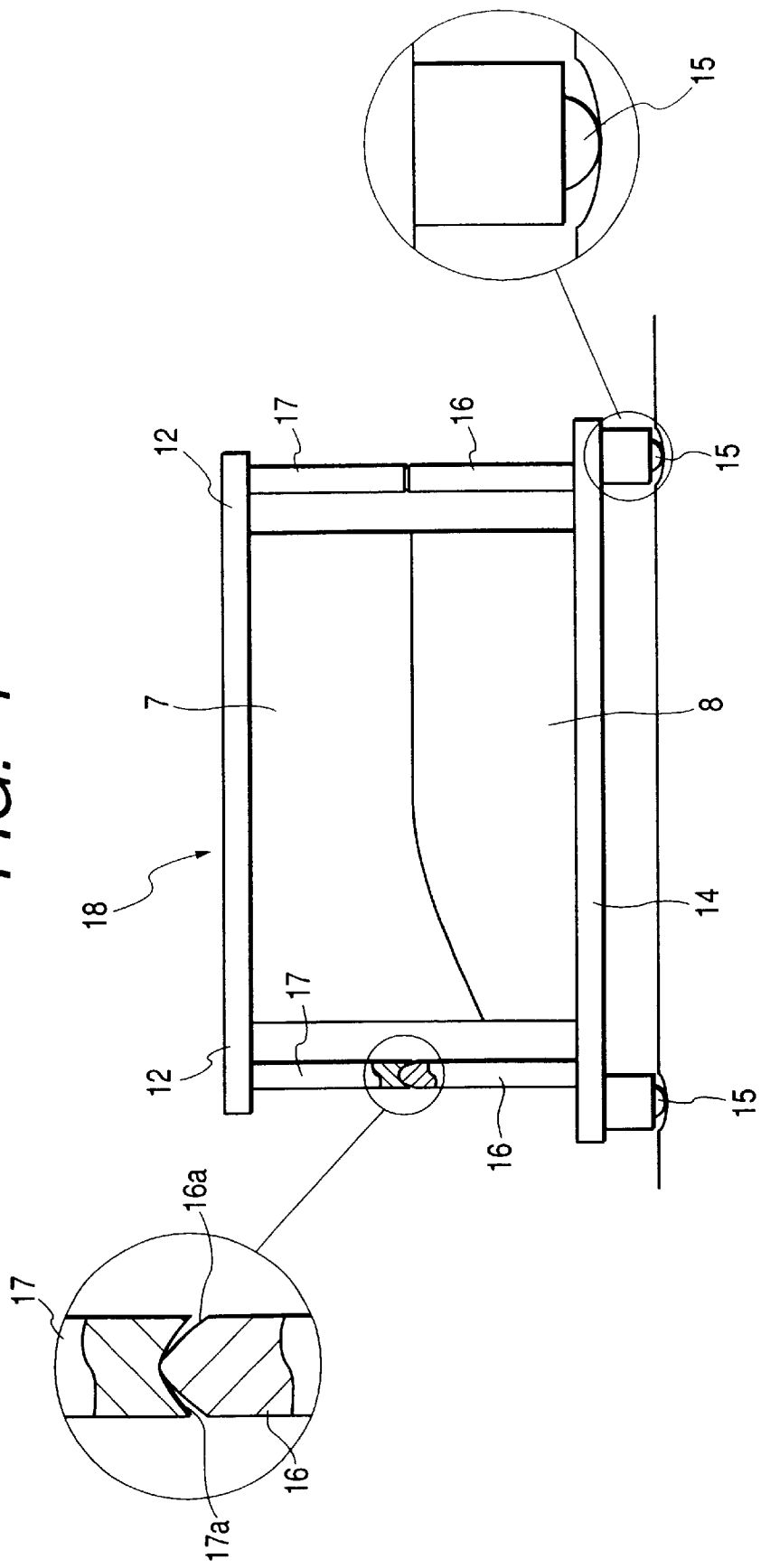

VIBRATION WELDING APPARATUS HAVING AN EASY TO ASSEMBLE JIG STRUCTURE

BACKGROUND OF THE INVENTION

1. Field of the Invention

The present invention relates to a novel vibration welding apparatus. In particular, the present invention relates to a technique for improving the attachment/removal operation of a upper jig to/from a vibrating member in a vibration welding apparatus in which, in a state where joint portions of two snythetic resin parts are brought into contact with each other, one of the synthetic resin parts is made to vibrate so that the joint portions are welded with each other.

2. Background of the Invention

There is a vibration welding apparatus in which, in a state where joint portions of two synthetic resin parts are brought into contact with each other, one of the synthetic resin parts is made to vibrate so that the joint portions are welded with each other.

In such a vibration welding apparatus, hertofore, upper and lower jigs are fixed by bolts at predetermined places. For example, as shown in FIG. 5, an upper jig a was fixed to a lower sufrace c of a vibrating member b by bolts d, d, . . . (only two of the bolts are shown in FIG. 5).

In a vibration welding apparatus, fixing with bolts is preferable because violent vibration is applied to the upper and lower jigs.

Though there was no problem in the lower jig because the working of attachment/removal of the lower jig was performed from above, a worker had to perform attachment/ removal of the upper jig from below in such a posture that the worker looked up at the upper jig. In addition, it was impossible to remove the upper jig a from the vibrating member b unless the bolts d were entirely removed fromt he vibrating member b. Moreover, it was necessary to thrust the bolts d into the vibrating member b from the beginning when the upper jig was to be attached. Thus, the working of the attachment/removal was inefficient.

In order to achieve more efficient production, i.e., easier removal/attachment, it is necessary to shorten the time required to replace the jigs.

It is therefore an object of the present invention to make it easy to attach/remove an upper jig to/from a vibrating member in a vibration welding apparatus.

SUMMARY OF THE INVENTION

In order to achieve the above objective, the present invention provides a vibration welding apparatus which comprises: an upper jig for supporting one of the synthetic resin parts; a lower jig for supporting the other of the synthetic resin parts; a vibrating member to which the upper jig is attached; a plurality of head bolts screwed down to a lower surface of the vibrating member; insertion holes each having a diameter larger than a diameter of a head portion of each of the bolts, the insertion holes being formed in an attached portion of the uppr jig; and notches each having a width smaller than the diameter of the head portion of each bolt and larger than a diameter of a shaft portion of each bolt, the notches being provided in spacers each of which as a width larger than the diameter of each of the insertion holes of the upper jig; wherein the head portions of the bolts are inserted into the insertion holes of the upper jig, the notches of the spacers are engaged with the shaft portions of the bolts between the attached portion of the upper jig and the head portions of the bolts, and the bolts are fastened to the vibrating member int eh state where the notches are engaged with the shaft portions, so that the attached portion is fastened through the spacers by the head portions of the bolts and the vibrating member to thereby attach the upper jig to the vibrating member.

Accordingly, attachment/removal of the upper jig can be performed by only loosening the head bolts slightly in the vibration welding apparatus according to the present invention.

BRIEF DESCRIPTION OF THE DRAWINGS

FIG. 2 is an enlarged sectional view showing a part of the invention;

FIG. 3 is an enlarged exploded perspective view of a part of the invention;

FIG. 4 is a partially cutaway side view showing a state in which upper and lower jigs have been connected.

DETAILED DESCRIPTION OF THE INVENTION

An embodiment of a vibration welding appartus according to the present invention will be described below with reference to the accompanying drawings. In the illustrated embodiment, the present invention is applied to an apparatus for welding synthetic resin parts in a car lamp, for example, a body and a lens.

Figure 1:
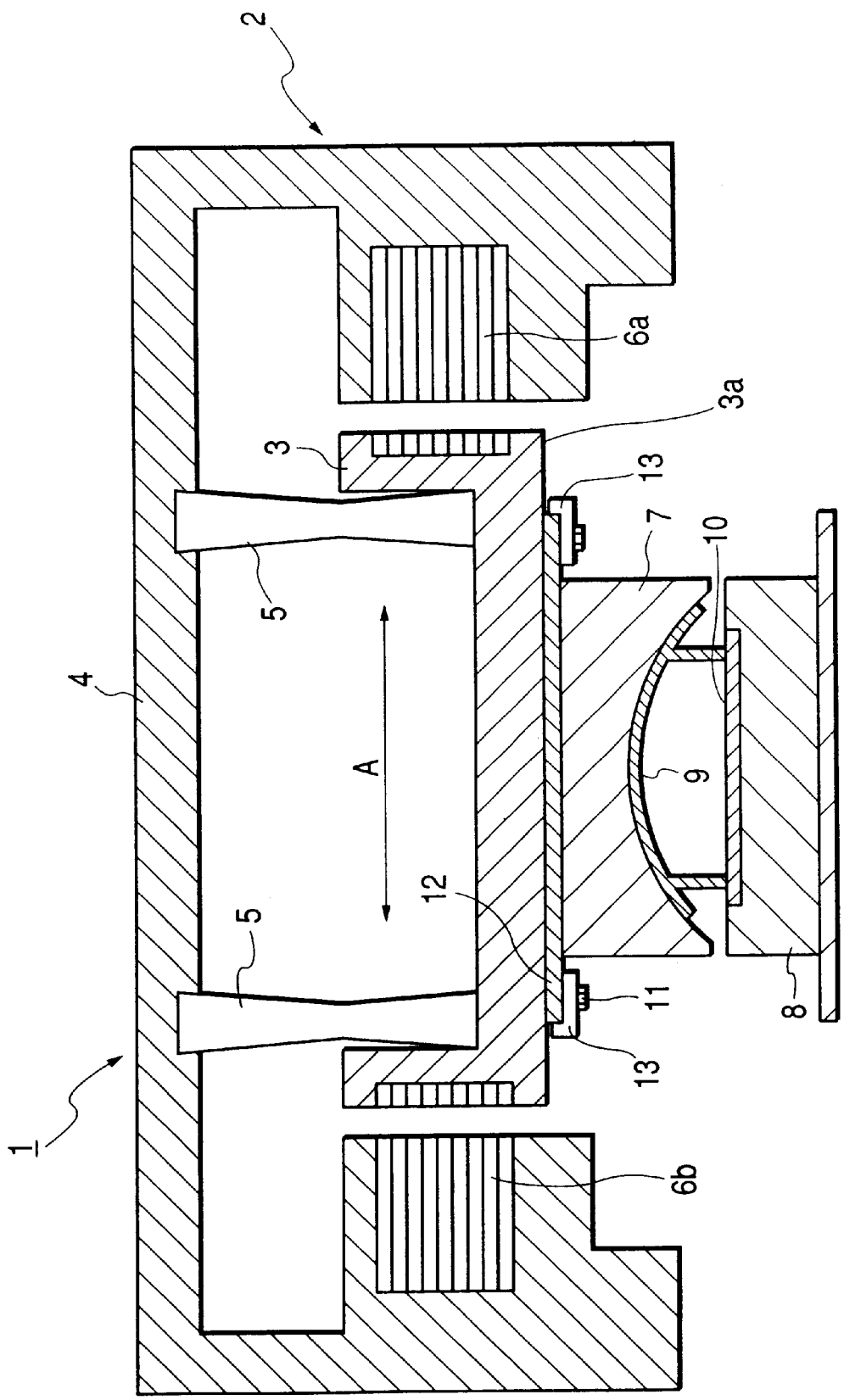
FIG. 1 is a schematic sectional view showing the outline of the configuration of an embodiment of a vibrating welding apparatus according to the present invention together with FIGS. 2 to 4.
Figure 5:
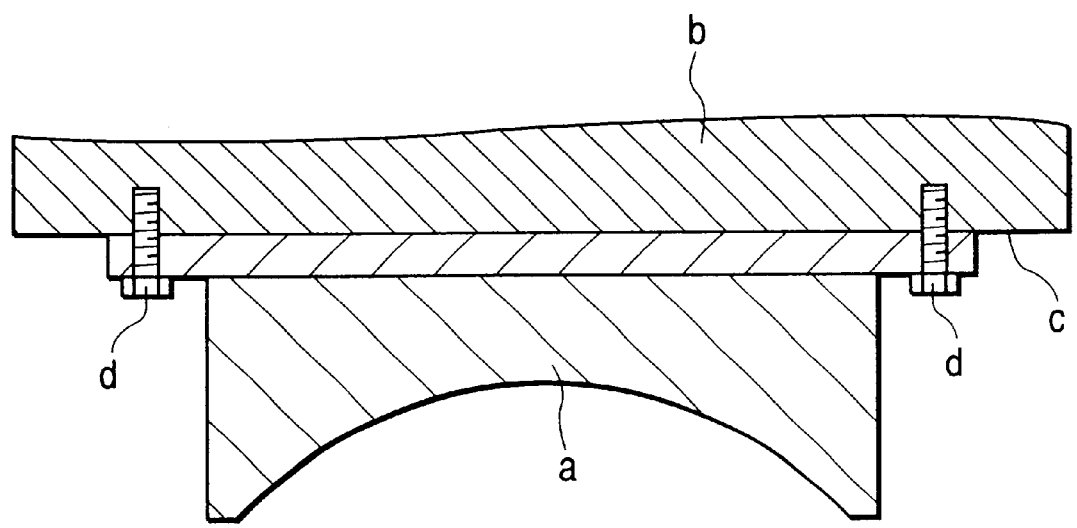
FIG. 5 is an enlarged sectional view showing a main part of a conventional vibration welding apparatus.

First, the outline of a vibration welding apparatus 1 will be described with reference to FIG. 1.

The vibration welding apparatus 1 has a vibration unit 2. The vibration unit 2 has a vibrating member 3 and a support member 4 for supporting the vibrating member 3. The vibrating member 3 is supported by the support member 4 through connecting springs 5 and 5 with high rigidity and high strength. Electromagnets 6a and 6b are disposed in portions of the support member 4 facing sides of the vibrating member 3 opposite to each other, respectively.

Therefore, the vibrating member 3 will vibrate in the direction shown by the arrow A when a current is applied alternately to the two electromagnets 6a and 6b located in opposition to each other.

An upper jig 7 is attached to a lower surface 3a of the vibrating member 3. In addition, a lower jig 8 is disposed under the vibrating member 3.

Then, for example, a lens 9 is supported by the upper jig 7 while a body 10 is supported by the lowr jig 8. In that state, the upper and lower jigs 7 and 8 are moved to approach each other so that a joint portion of the lens 9 and a joint portion of the body 10 are brought into contact with each other, and predetermined pressure, for example, pressure of 300 Kg is applied between the upper and lower jigs 7 and 8. The vibrating member 3 is made to vibrate in that state, so that the joint portion of the lens 9 and the joint portion of the body 10 are welded. When the welding between the lens 9 and the body 10 is completed, the upper and lower jigs 7 and 8 are separated, and a coupled body of the body 10 and the lens 9 which are left in the lower jig 8 is extracted.

The upper jig 7 is attached to the lower surface 3a of the vibrating member 3 in the following manner.

A plurality of head bolts 11, 11, . . . (only two of them are shown in FIG. 1) are screwed down to the lower surface 3a of the vibrating member 3 in advance. Then, a predetermined gap, that is, a gap larger than the total size of the thickness of an attached portion 12 of the upper jig 7, which will be described later, and the thickness of a spacers 13, is provided between the lower surface 3a of the vibrating member 3 and each head portion 11a of the head bolts 11.

The attached portion 12 expands like a flange in an upper end portion of the upper jig 7, and insertion holes 12a, 12a, . . . are formed in portions of the attached portion 12 corresponding to where the above-mentioned head bolts 11 are to be attached. A diameter L1 of the insertion hole 12a is formed to be much larger than a diameter L2 of the head portion 11a of the head bolt 11 (see FIG. 3).

In addition, spacers 13, the number of which corresponds to the number of the head bolts 11, are provided. Each of the spacers 13 is substantially rectangular, and has a width L3 which is made larger than the diameter L1 of the insertion hole 12a of the upper jig 7. An abutment protrusion portin 13a is formed on the upper surface of an outer edge portion of the spacer 13. In addition, a notch 13b extending from the inner edge toward the outer edge portion is formed at the inner edge of the spacer 13. The width L4 of the notche 13b is larger than a diameter L5 of a shaft portion 11b of the head bolt 11 and smaller than the diameter L2 of the head portion 11a of the head bolt 11. That is, the above-mentioned dimensions L have a relation of:

$$L3>L1>L2>L4>L5$$

To attached the upper jig 7 to the lower surface 3a of the vibrating member 3, first, each of the head bolts 11 screwed down to the lower surface 3a of the vibrating member 3 are inserted into each of the insertion holes 12a, respectively, of the upper jig 7 so that the upper surface of the attached portion 12 of the upper jig 7 is brought into contact with the lower surface 3a of the vibrating member 3.

Then, the spacers 13 are inserted, from the outside, to the gaps between the lower surface of the attached portion 12 of the upper jig 7 and the head portions 11a of the head bolts 11 so that the notches 13b are engaged with the shaft portions 11b of the head bolts 11. At this time, the abutment protrusion protions 13a of the spacers 13 abut against the side surfaces of the attached portion 12 of the upper jig 7 so that the spacers 13 are positioned.

Then, the head bolts 11 are screwed into the vibrating member 3 so that the attached portion 12 of the upper jig 7 and the spacers 13 are fastened by the head portions 11a of the head bolts 11 and the lower surface 3a of the vibrating member 3. In such a manner, the upper jig 7 is attached to the lower surface 3a of the vibrating member 3.

The upper jig 7 is easily removed from the vibrating member 3, if the head bolts 11 are loosened slightly. As a result, the spacers 13 can be extracted from the gaps between the lower surface of the attached portion 12 of the upper jig 7 and the head portions 11a of the head bolts 11. As a result, the head bolts 11 can be extracted relatively from the insertion holes 12a, respectively, of the attached portion 12 of the upper jig 7, so that the upper jig 7 can be removed from the vibrating member 3. In other words, the head bolts do not have to be completely removed from the vibrating member 3 in order to remove the upper jig 7.

The upper jig 7 removed from the vibrating member 3 is removably coupled with the lower jig 8 in a unit, with the structure illustrated in FIG. 4.

The lower jig 8 is fixed into a substantially plate-like base member 14. Balls 15 are supported rollably on four corner portions of the lower surface of the base member 14. In addition, connection bars 16 are provided erectly on four corner portions of the upper surface of the base member 14. Upper end portions 16a of the connecting bars 16 are made into tapered portions. Although the four balls 15 and the four connecting bars 16 are provided here as mentioned above, the respective number of the balls and connecting bars is not limited to four, but may be three or more than four.

In four corner portions of the attached portion 12 of the upper jig 7, connecting bars 17 are provided vertically on portions corresponding to the connecting bars 16 of the lower jig 8. In addition, receiving recess portions 17a are formed in the lower end surfaces of the connecting bars 17, respectively.

Thus, the tapered portions 16a of the connecting bars 16 of the lower jig 8 are fitted into the receiving recess portions 17a of the connecting bars 17 of the upper jig 7 removed from the vibrating member 3. Accordingly, the upper and lower jigs 7 and 8 are integrally connected so as to be able to be handled as a single unit 18. When this jig unit 8 is moved on a plane, the balls 15 rollably provided on the lower surface of the base member 14 of the lower jig 8 roll to allow the jig unit 18 to move easily and smoothly.

Then, the above-mentioned connecting bars 16 of the lower jig 8 are provided so as to be able to be removed or pushed down. When the working of welding is performed, the connecting bars 16 are removed from the lower jig 8 or pushed down so that the connecting bars 16 cannot become obstructions against the working of welding.

In the above-mentioned vibration welding apparatus 1, the upper jig 7 can be attached to and removed from the vibrating member 3 without entirely removing the head bolts 11 from the vibrating member 3, so that the workability in attachment/removal of the upper jig 7 to/from the vibrating member 3 is extremely improved.

In addition, when the upper and lower jigs 7 and 8 are not used for the working of welding, the upper and lower jigs 7 and 8 can be removably connected into a single unit. Accordingly, not only handling such as storing, carrying or the like of the upper and lower jigs 7 and 8 is easy, but also there is no fear that the upper and lower jigs 7 and 8 are dispersed from each other.

The shape and structure of each part shown in the above-mentioned embodiment merely show a specific example for carrying out the present invention. The technical scope of the present invention should not be limited by these shapes and structures.

As is obvious from the above description, according to the present invention, there is provided a vibration welding apparatus in which, in a state where joint portions of two synthetic resin parts are brought into contact with each other, one of the synthetic resin parts is made to vibrate so that the joint portions are welded with each other, the vibration welding apparatus comprising: an upper jig for supporting one of the synthetic resin parts; a lower jig for supporting the other of the synthetic resin parts; a vibrating member to which the upper jig is attached; a plurality of head bolts screwed down to a lower surface of the vibrating member; insertion holes each having a diameter larger than a diameter of a head portion of each of the bolts, the insertion holes being formed in an attached portion of the upper jig; and notches each having a width smaller than the diameter of the head portion of each bolt and larger than a diameter of a shaft portion of each bolt, the notches being provided in spacers each of which as a width larger than the diameter of each of the insertion holes of the upper jig; wherein the head portions of the bolts are inserted into the insertion holes of the upper jig, the notches of the spacers are engaged with the shaft portions of the bolts between the attached portion of the upper jig and the head portions of the bolts, and the bolts are fastened to the vibrating member in the state where the notches are engaged with the shaft portions, so that the attached portion is fastened through the spacers by the head portions of the bolts and the vibrating member to thereby attach the upper jig to the vibrating member.

Accordingly, in the vibrating welding apparatus according to the present invention, the upper jig can be attached to and removed from the vibrating member without entirely removing the head bolts from the vibrating member, so that the workability of the attachment/removal of the upper jig to/from the vibrating member is extremely improved.

In the invention, connecting bars are provided in the upper and lower jigs respectively so that the connecting bars project to each other and front ends of the connecting bars are removably connected with each other. Accordingly, not only handling such as storing, carrying or the like of the upper and lower jigs is easy, but also there is no problem that the upper and lower jigs 7 and 8 may be isolated from each other.

What is claimed is:

1. A vibration welding apparatus in which, in a state where joint portions of two synthetic resin parts are brought into contact with each other, one of said two synthetic resin parts is made to vibrate so that said joint portions are welded with each other, said vibration welding apparatus comprising:

an upper jig for supporting one of two said synthetic resin parts;

a lower jig for supporing the other of two said synthetic resin parts;

a vibrating member to which said upper jig is attached;

a plurality of head bolts screwed into a lower surface of said vibrating member;

insertion holes formed in an attached portion of said upper jig, each of the insertion holes having a diameter larger than a diameter of a head portion of each of said bolts; and spacers with notches, each notch having a width smaller than the diameter of said head portion of each bolt and larger than a diameter of a shaft portion of each bolt, the spacers each having a width larger than the diameter of each of the insertion holes of said upper jig, wherein said head portions of said bolts are inserted into the insertion holes of said upper jig, the notches of said spacers are engaged with said shaft portions of said bolts between said attached portion of said upper jig and said head portions of said bolts, and said bolts are fastened to said vibrating member in the state where the notches are engaged with said shaft portions, so that said attached portion is fastened through said spacers by said head portions of said bolts and said vibrating member, to thereby attached said upper jig to said vibrating member.

2. a vibration welding apparatus according to claim 1, wherein connecting bars are provided in each of said upper and lower jigs respectively so that said connecting bars project to each other and are removably connected with each other, for keeping said upper and lower jigs in a single unit for easier handling when said vibrating welding apparatus is not in a vibrating operation.

3. A vibration welding apparatus according to claim 2, wherein said connecting bar of said lower jig is removably attached to a base member of said lower jig and said connecting bar of said lower jig has an upper end portion which connects to said connecting bar of said upper jig.

4. A vibration welding apparatus according to claim 2, wherein said connecting bar of said upper jig is removably attached to the attached portion of said upper jig and said connecting bar of said upper jig has a receiving portion which connects to said connecting bar of said lower jig.

* * * * *